United States Patent

Bonvin

(10) Patent No.: US 7,893,643 B2
(45) Date of Patent: Feb. 22, 2011

(54) PAIR POLE ASYMMETRY COMPENSATION IN BACK ELECTROMOTIVE FORCE ZERO CROSS DETECTION

(75) Inventor: Frederic Bonvin, Longmont, CO (US)

(73) Assignee: STMicroelectronics, Inc., Coppell, TX (US)

( * ) Notice: Subject to any disclaimer, the term of this patent is extended or adjusted under 35 U.S.C. 154(b) by 512 days.

(21) Appl. No.: 12/020,319

(22) Filed: Jan. 25, 2008

(65) Prior Publication Data

US 2008/0180047 A1 Jul. 31, 2008

Related U.S. Application Data

(60) Provisional application No. 60/886,865, filed on Jan. 26, 2007.

(51) Int. Cl.
*H02P 6/06* (2006.01)
*G11B 7/00* (2006.01)

(52) U.S. Cl. ............... 318/561; 318/400.1; 318/400.32; 318/400.35; 369/53.1

(58) Field of Classification Search ............ 318/400.01, 318/400.06, 400.1, 400.13, 400.24, 400.32, 318/400.34, 400.35, 560, 561, 608, 632; 388/800, 809; 324/160, 210–212; 369/30.12, 369/47.39, 47.47, 53.1; 360/51, 69, 75, 77.02, 360/77.04, 77.05, 77.06, 77.07, 77.08, 125.01
See application file for complete search history.

(56) References Cited

U.S. PATENT DOCUMENTS

| | | | | |
|---|---|---|---|---|
| 5,319,289 A | * | 6/1994 | Austin et al. ........... | 318/400.14 |
| 5,466,997 A | * | 11/1995 | Utenick et al. ......... | 318/400.21 |
| 5,631,999 A | * | 5/1997 | Dinsmore .................. | 388/805 |
| 5,767,643 A | * | 6/1998 | Pham et al. ............ | 318/400.13 |
| 6,906,485 B2 | * | 6/2005 | Hussein .................. | 318/400.28 |
| 7,042,668 B1 | * | 5/2006 | Emo ...................... | 318/400.13 |
| 7,079,459 B2 | * | 7/2006 | Watt et al. ................ | 369/47.39 |
| 7,103,498 B2 | * | 9/2006 | Dorner ....................... | 702/151 |
| 7,190,145 B2 | * | 3/2007 | Grand et al. ........... | 318/400.13 |
| 7,239,098 B2 | * | 7/2007 | Masino ................... | 318/400.35 |
| 7,583,464 B2 | * | 9/2009 | Kim et al. ................. | 360/73.03 |
| 2002/0131333 A1 | * | 9/2002 | Watt et al. ................ | 369/30.12 |
| 2007/0206323 A1 | * | 9/2007 | Im et al. ..................... | 360/126 |

* cited by examiner

*Primary Examiner*—Walter Benson
*Assistant Examiner*—Eduardo Colon
(74) *Attorney, Agent, or Firm*—Lisa K. Jorgenson; William J. Kubida (57) ABSTRACT

Disk drive spindle jitter is comprised of electrical noise, error due to pair pole asymmetry, and random disk speed variances. Error caused by pair pole asymmetry can be identified and compensated for by detecting over a single rotation of a rotor a plurality of zero cross signals. These signals can be statistically analyzed over a period of a plurality of revolutions of the rotor so as to identify the systematic error caused by pair poles. Once identified, this pair pole error can be used to modify zero cross signals and/or modify commutation signal driving the disk so as to arrive at a more accurate determination of disk speed and to precisely control the speed of the disk.

29 Claims, 4 Drawing Sheets

PAIR POLE ASYMMETRY COMPENSATION IN BACK ELECTROMOTIVE FORCE ZERO CROSS DETECTION

RELATED APPLICATION

The present application claims the benefit of priority to U.S. Provisional Patent Application No. 60/886,865, filed Jan. 26, 2007, which is hereby incorporated by reference in its entirety for all purposes as if fully set forth herein.

BACKGROUND OF THE INVENTION

1. Field of the Invention

Embodiments of the present invention relate, in general, to systems and methods for reducing jitter associated with disk drive back electromotive force zero cross signal error and particularly to identifying and reducing the pair pole asymmetry contribution to jitter.

2. Relevant Background

Hard disk drives remain popular as long term and high volume storage devices for personal computers. Such drives typically include a plurality of rigid disks having coatings capable of being magnetized. Data can be written to these disks by magnetizing successive data cells defined along concentric data tracks of the disks. Because of the rigidity of the disks, the further inclusion of a servo system that is capable of precise track following permits the data tracks to be very closely spaced so that a hard disk drive can store a very large amount of data in a very small volume.

Modern disk drives use brushless dc motors ("BLDC"), also called spindle motors, to rotate the disks at the desired operating rotational speed. These motors generally have a stationary stator containing a plurality of phases, each phase having one or more sets of electrical windings or coils that are wrapped around teeth within the stator with the sets of windings in each phase being electrically connected in series. Each phase is generally connected with the other phases so that all phases share a common center tap as in a "Y" or "star" configuration, without a real center tap or as in a "Δ" configuration, or the like. The motors also have a rotor capable of rotation that contains a plurality of permanent magnet segments.

Figure 1A:
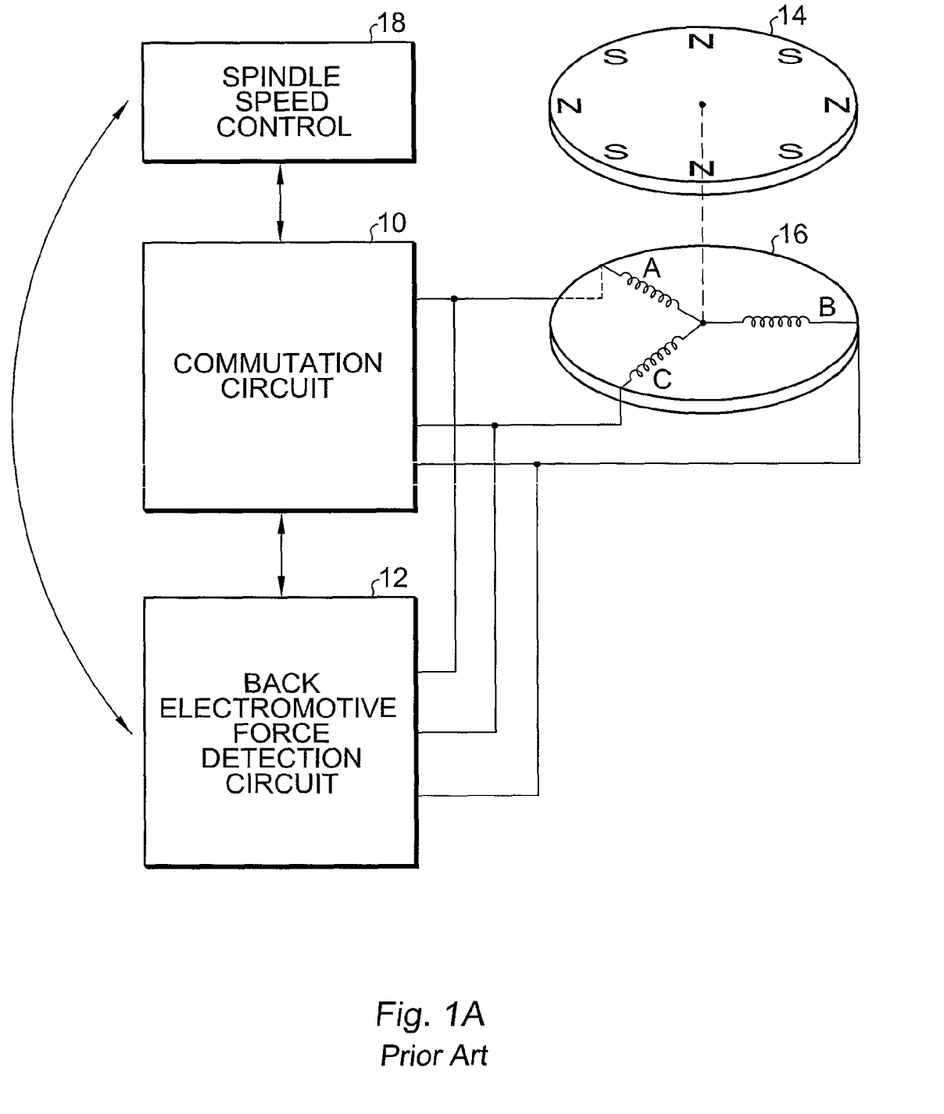
FIG. 1A shows a high level block diagram of a disk drive control and commutation system as known in the prior art.
Figure 1B:
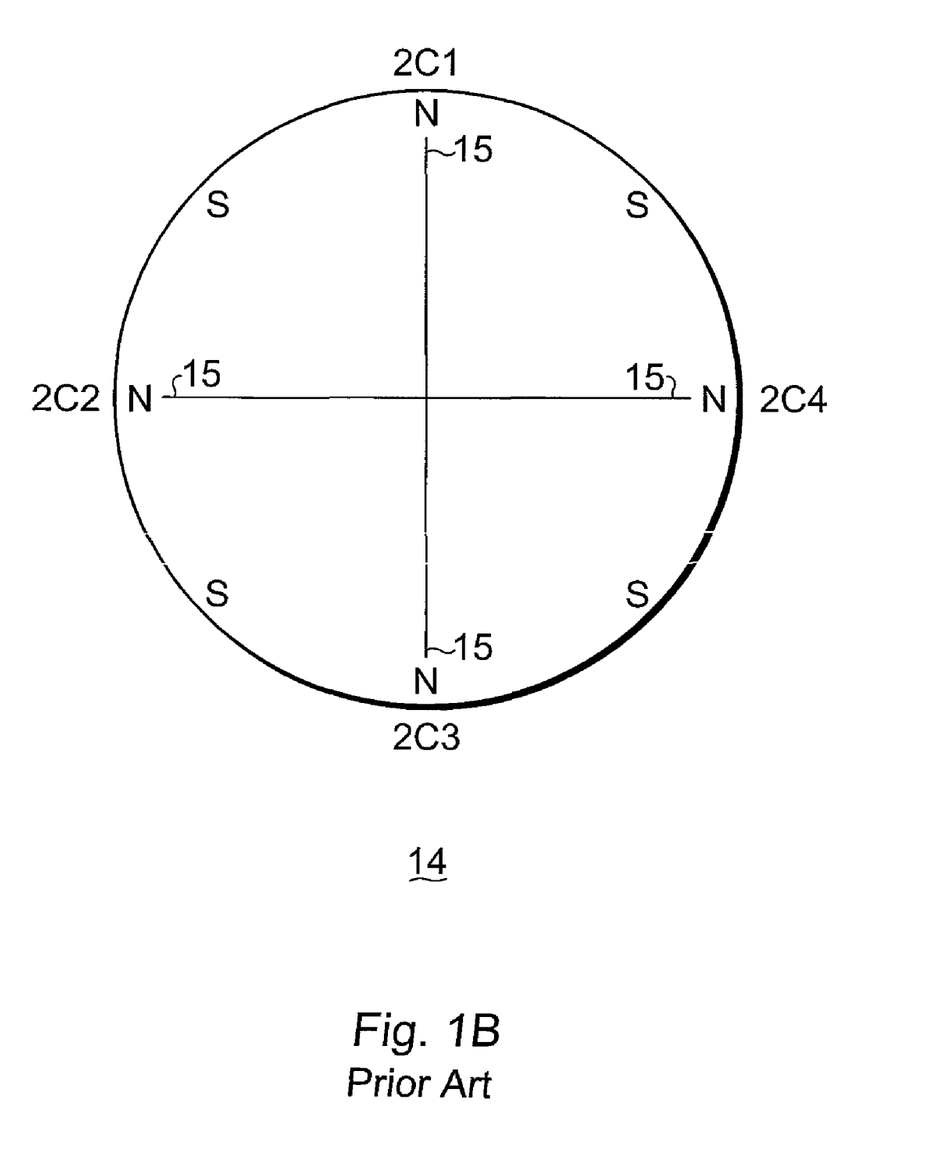
FIG. 1B is an expanded view of the rotor shown in prior art FIG. 1A.

FIG. 1A shows a block diagram of a speed control circuit for a disk drive as is known in the prior art. The speed control circuit consists of a commutation circuit 10, a back electromotive force ("BEMF" or "back EMF") detection circuit 12, a spindle speed control unit 18, a rotor 14, and a stator 16 with stator coils A, B, and C. It is well known in the art that a disk drive is manufactured by combining the block diagram of the speed control circuit in FIG. 1A with read/write heads, head motors, magnetic media, a rotor, and a disk drive housing. The rotor, which is shown in FIG. 1B, rotates responsive to coils A, B, and C being energized in a standard sequence, such as in bipolar operation. In such an operation (also called a two phase ON motor), the commutation circuit orients the magnetic flux in the motor so as to achieve peak efficiency. The spindle speed control 18 regulates the amplitude of the magnetic flux to either accelerate or decelerate the motor. The commutation circuit 10 also enables the BEMF of the floating coil to be buffered so that the BEMF detection circuit 12 can generate a zero cross signal from the buffered BEMF signal. According to this example, the zero cross signal is used by the commutation circuit 10 to determine the position of the rotor 14 relative to the stator coils A, B, and C and is used to control the rotational velocity of the rotor. The technique described above is a rough way of commuting the BLDC motor.

A zero cross is associated with the passing of a pair pole. FIG. 1B shows an expanded view of the rotor 14. In this particular example, there are 4 pair poles (north south pairs). According to one technique, each north pole represents a zero cross 15, thus for this example there are 4 zero crosses that are theoretically spaced at 90 degree intervals. More recently, the electrical period can be divided into more steps (typically 24, 48, or 96) in order to have a finer position control for magnetic flux. Furthermore, and according to other techniques known in the art, the current injected into coils A, B, and C varies in a sinusoidal waveform in phase with sinusoidal waveform of the BEMF signal in order to have a constant mutual torque with minimal torque variance.

Position, and therefore speed, of a disk drive platter is commonly determined by detecting the back EMF generated between one phase and the center tap (real or reconstructed). For example, it is typical for a disk drive motor to have six pair poles so that each pole-pair interaction theoretically signifies $\frac{1}{6}^{th}$ of a motor rotation. However, in practice, it is difficult during manufacturing to accurately position the poles. In particular, the rotor may not be perfectly formed. Even if the rotor is perfectly formed, mechanical and electrical differences in the windings of the various coils could result in effective positional differences among the poles.

As described above, the disks are mechanically mounted to the rotor and rotated by the energizing of the coil windings within a phase in the stator to induce magnetic fields that interact with the permanent magnet segments in the rotor to cause the rotor and the disk(s), to rotate in the desired direction at the desired operating speed. The selective energizing of phases in the stator in a predetermined sequence is known as commutation of the motor, which simply involves providing a series of timed commutation steps wherein energy is imparted to the motor to cause it to rotate. The time between each commutation step is called a commutation period, and the number of commutation periods within one mechanical revolution of the motor is a function of the number of phases and the total number of north and south poles in the rotor magnet segments. For example, a three phase, twelve pole motor would have 36 commutation steps and 36 corresponding commutation periods in each mechanical revolution of the motor, with each commutation step occurring at a unique mechanical alignment of a winding and a pole, where a switch is made from one configuration or commutation step to the next.

As understood in the art, a commutation step involves supplying the motor with current to one phase, sinking current from another phase, and holding a third phase at a high impedance so that it remains un-energized. A commutation cycle is defined as a complete sequence of commutation steps such that every phase has, in turn, sourced current, sunk current, and remained un-energized current. The proper sequencing and timing of commutation steps will cause the motor to rotate in the desired direction at the desired speed, and generally there will be a plurality of commutation cycles for each mechanical revolution of the motor. The sequencing and timing of commutation steps are supplied to the motor by commutation circuitry to cause the motor to rotate at the desired operating speed.

Typically, modern disk drives have a back EMF sense circuit that measures the back EMF generated on the un-energized phase held at high impedance, compares this voltage to the voltage on the center tap (real or artificially generated), and generates a signal at a zero crossing of the voltages, that is, when the back EMF voltage changes polarity with respect to the voltage on the center tap. The point at which the zero crossing occurred is then used as a reference for the generation of the timing of the next commutation pulse, as well as a reference to indicate the position and relative speed of the motor. A zero crossing detector literally detects the transition of a signal waveform, ideally providing at narrow pulse that coincides exactly with the zero voltage condition. Note that when a sinusoidal driving mode is used, none of the phases are un-energized except shortly before the expected zero cross of the BEMF on one phase. This phase is put into a floating mode (un-energized) in order to detect/measure the BEMF. It is also very common in sinusoidal driving mode not to use all of the zero crossings but rather a limited set of zero crossings.

Simply stated, BEMF is voltage across the coil. BEMF is proportional to the magnet flux variation created by the rotor. Recall that the rotor comprises a permanent magnet that consists of a succession of north and south poles (a north and south pole comprising a pair pole). If a north pole is approaching (increasing magnetic flux), the coil in the BEMF is positive, and if a north pole is moving away (decreasing magnetic flux) from the coil, the BEMF is negative. Similarly, decreasing magnetic flux can mean a south pole approaching the coil. Because the BEMF is proportional to the derivate of the flux (and not the flux itself), the BEMF is also proportional to the spindle speed. Similarly, the number of pair poles associated with a motor corresponds directly to the ratio between the mechanical turn of the rotor and the electrical frequency. Thus, for example, a motor having four pair poles has four electrical periods (BEMFs) per mechanical turn of the rotor.

At the time the north pole is the most aligned with a pair of coils, the magnetic flux is changing from increasing to decreasing and so the BEMF is zero at that exact position (independent of the spindle speed); this point can be called zero cross with negative slope (increasing to decreasing flux). Another zero BEMF point is reached for the south pole; this one can be called zero cross with positive slope (decreasing to increasing flux). Because the zero crossings are independent of the spindle speed, they provide a precise yet independent means to know the rotor position.

It will be recognized by those of skill in the art that slight variations exist in the operating speed of a spindle motor during operation and that it becomes increasingly important to control and minimize these variations to ensure proper alignment of the transducer head and the sector before data is stored or retrieved from a disk.

One significant source of variation in the operating speed of a disk comes from manufacturing tolerances within the spindle motor itself. These manufacturing tolerances may be due to variations in bearings and bearing surfaces, variations in field strength of permanent magnets in the spindle motor, variations in resistance and inductance in phase windings in the spindle motor, and, most importantly, the variation in the spacing of the magnetic poles and the slots between windings. These variations can significantly affect the timing of the zero crossings, which in turn will affect the timing of the subsequent commutation steps and will affect the ability of the speed control circuitry to maintain the rotation of the disks at a constant speed.

Further, before data may be stored on a particular sector in a data track, the transducer head must first locate the correct data track and detect the boundary of the correct sector as it passes under the transducer head. This means the variations in the operating speed of the disks typically requires the use of a larger timing buffer to prevent data corruption than would be necessary if the motor were running at near zero speed variation.

A problem in many prior art hard disk drives that use such back EMF sensing and commutation timing methods is the use of the measured electrical period between two consecutive zero crosses to determine the timing of subsequent commutation steps (extrapolation method). Because of the variation associated with the timing of the zero crossings due to manufacturing tolerances in the spindle motor, significant error can exist in the placement of commutation steps based on the previous zero crossing period, which causes further motor speed variations due to misinterpretation by the spindle speed regulator or controller.

A related problem in many such prior art hard disk drives follows from the use of zero crossings to indicate the motor speed and position; because of the variations in zero crossings due to manufacturing tolerances within the spindle motor, the motor speed control may provide unnecessary compensation of the motor speed at subsequent commutation steps. For example, if, as a result of manufacturing tolerances, a zero crossing occurs at a point in time that indicates the motor is running too fast, when in fact the motor is running at the correct speed, the speed control circuitry may unnecessarily cause the motor to slow down by reducing the supplied current. It has been observed that a certain amount of this error is systematic for each mechanical rotation of the disks in a motor; a motor running through each mechanical revolution may be sped up or slowed down at the same steps based on these manufacturing variations while maintaining an overall average constant speed.

Some drive systems are operated in a linear mode with smoothly varying power continuously applied to the motor coils. Linear mode operation is favorable to detecting clean back EMF signals. However, under certain conditions, such as upon commutation of the drive between coil pairs of the motor, noise occurs that may give an inaccurate signal. One technique known in the art to compensate for this noise is to have, in addition to a period counter (an up counter) for measuring time between reference (e.g., zero) crossings of the back EMF, other counters including a delay counter and a mask counter to help minimize torque ripple and to avoid inaccurate signals. Such techniques are successful, particularly in linear mode operation, but nonetheless rely on an accurate zero cross measurement.

In addition to the linear mode, another way of operating a drive system is in a nonlinear mode with discontinuities in application of drive current to the coils. Pulse width modulation ("PWM") is a known technology for operating drives in a nonlinear mode. In PWM operation, the power to the coils follows the same overall pattern as in the linear mode but is repeatedly chopped with brief segments of on-time alternating with brief segments of off-time. For example, there can be PWM operation with on-off cycles repeated at a frequency of between 25 kHz to 100 kHz. In a typical on-off cycle, lasting for about 20 us, there may be 14 us of on time followed by 6 us of off time, then a repeat of such a cycle would follow.

PWM operation has the attraction of lower power dissipation in electronic drivers. However, the switching in the PWM mode causes switching noise and raises the probability of an inaccurate BEMF signal despite presently known measures such as the above-mentioned mask counter and delay counter.

A significant challenge in providing consistent disk motor control is reducing spindle vibrations or jitter. "Jitter" is a term sometimes used in the motor control art to characterize conditions of instability where precise detection of zero crossings and precise switching of drive current from phase to phase are not precise. Spindle jitter has at least three components; 1) electrical noise, 2) pair pole asymmetry, and 3) real speed variation. The inherent nature of PWM operation makes it difficult to achieve low jitter in brushless, sensorless motor drives because of modulation or chopping that occurs near a zero crossing.

All of the aforementioned techniques for precise motor control rely on an accurate and reliable measurement of zero crossings. The aggressiveness of the spindle speed controller is limited by the amount of jitter. Thus, a reduction in jitter can allow the spindle speed controller to be more aggressive resulting in better measurement precision and spindle speed bandwidth.

SUMMARY OF THE INVENTION

Methods and systems for reducing jitter associated with disk dive motor assemblies are disclosed. According to one embodiment of the present invention, a system can detect and compensate a plurality of zero crossing signals for pair pole asymmetric error. From each rotation of the rotor, a plurality of zero cross signals are detected and used to determine rotational data corresponding to the rotor. Over a series of rotations, a plurality of rotational data determinations can be collected and statistically analyzed to arrive at a determination of systematic error induced by pair pole asymmetry.

Using the determined error associated with each pair pole asymmetry, each zero crossing data can be modified and used to calculate an accurate speed of the disk. Furthermore, the modified (corrected) zero crossing data can be used to adjust commutation signals so as to provide a refined and more precise application of electrical charges driving the disk drive motor.

According to another embodiment of the present invention, each rotor can have a plurality of pair poles and each pair pole can be associated with a plurality of electrical phases. Zero crossing signal data can be collected and analyzed for each phase of each pair pole of a single rotation of the rotor thus increasing the robustness of the determination of the pair pole asymmetry.

According to yet another embodiment of the present invention, a method for controlling the spindle speed of a disk drive assembly includes compensating zero crossing signals for error associated with pair pole asymmetry. According to the embodiment of the present invention, a plurality of zero crossing signals is detected for each mechanical rotation of the rotor of the disk drive assembly. Each zero crossing signal can be associated with an electrical period that is collected and stored over a series of rotations of the rotor. Once captured, a statistical analysis of the electrical periods can be accomplished to identify systematic error associated with the pair poles.

This systematic error is the pair pole asymmetric error component of spindle jitter. Once known, each zero crossing signal can be compensated to remove systematic pair pole asymmetry to arrive at a more accurate and reliable determination of rotor speed. Additionally, the modified zero crossing signals can be used by a commutation circuit to modify commutation signals and to aggressively control the speed of the rotor without fear that the commutation signals will induce additional error due to improper signal applications.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Disclosed herein are system and method embodiments for identifying and reducing pair pole asymmetry associated with disk drive jitter. Jitter, sometimes referred to as spindle jitter, is comprised of electrical noise, pair pole asymmetry, and real speed variations. Ideally, the disk drive motor controller attempts to minimize variations in the real speed of the disk thereby maximizing the ability to read data to and from the disk.

According to one embodiment of the present invention, systematic error associated with pair pole asymmetry of the disk drive is identified and removed from the jitter computation enabling the controller to calculate a more accurate assessment of disk rotational speed as well as provide an improved commutation of the electrical charges driving the disk.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 2:
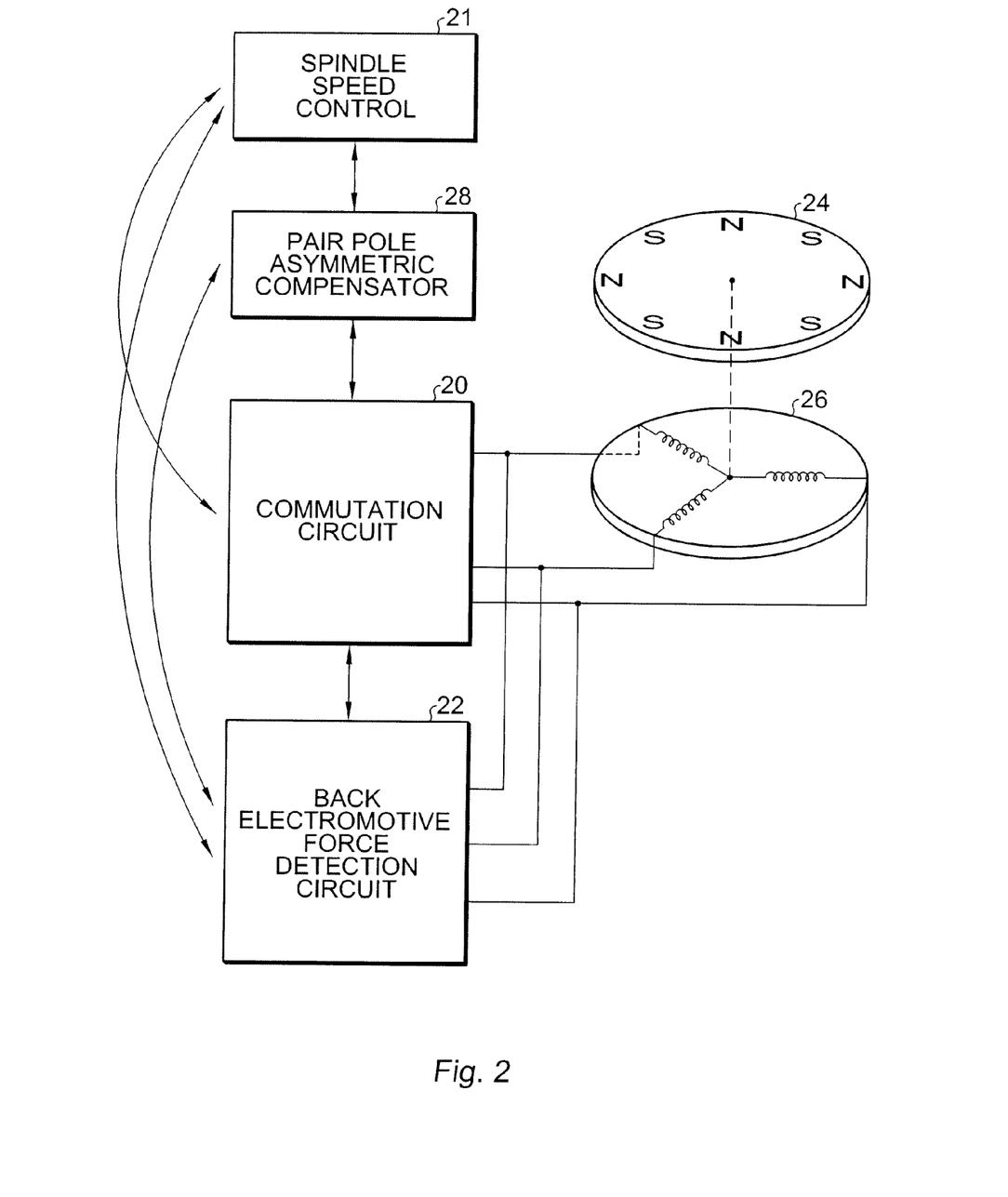
FIG. 2 shows a high level block diagram of a disk drive control and commutation system for reduction of pair pole asymmetry according to one embodiment of the present invention.

FIG. 2 shows a high level block diagram of a system from reducing pair pole asymmetry in disk drive jitter computations according to one embodiment of the present invention. As shown in FIG. 2, a rotor is rotationally coupled to a stator 26 that is correspondingly communicatively coupled to a commutation circuit 20 and a back EMF detection circuit 22. According to one embodiment of the present invention, the back EMF detection circuit 22 is communicatively coupled to a pair pole asymmetry compensation device 28 that is also communicatively coupled to the commutation circuit 20.

The pair pole asymmetry compensation device 28 can include, in one embodiment of the present invention, a memory for storing back EMF data from a plurality of zero cross signal readings as well as memory capable of storing executable code or instructions. In addition, the pair pole asymmetry compensation device 28 can include a microprocessor or similar device capable of performing computations directed by the stored code and/or instructions. The pair pole asymmetric compensation device and the methodology it comprises to identify and correct for pair pole asymmetry is recognized to work in conjunction with the commutation circuit 20, the back EMF detection circuit 22 and other disk drive control circuitry as would be known in the art.

As is known in the prior art, zero cross signals can be detected from the rotor as pair poles traverse over coils present in the stator. These zero cross signals are then used to determine the speed of the rotor and further used to commute electrical charges to the coils to drive the disk. As previously discussed, this process is not without error.

One significant source of that error, and the focus of the present invention, is systematic jitter error. Jitter error associated with a disk drive mechanism comprises systematic and non-systematic error. Non-systematic error generally includes electrical noise and jitter error associated with real speed variations in the drive while systematic error includes pair pole asymmetry and various electronic mismatches. As a result of the asymmetric characteristics of the pair poles, the position of the rotor as determined from the magnetic information (BEMF) is different from the rotor's true position. By reducing or eliminating the systematic error, the disk drive control circuitry, including the commutation circuit, can direct a more precise and aggressive means by which to regulate the disk speed.

According to one embodiment of the present invention, the back EMF detection circuit gathers zero cross signals from each of the pair poles as the rotor rotates above the stator. As the rotor rotates, each pair pole develops a changing magnetic flux that creates a corresponding voltage (back EMF) in the coil. For example, an approaching north pole creates a positive BEMF while an approaching south pole creates a negative BEMF. Likewise, a departing north pole creates a negative BEMF and a departing south pole a positive BEMF. As the BEMF transitions from positive to negative or negative to positive a zero cross signal is created.

Because the number of pair poles is known as is their position on the rotor, the speed of the rotor and thus the disk can be determined based on these zero cross signals. For one pair pole, the shape of BEMF (typically a sinusoidal curve) created by the passing magnetic flux is termed an electrical period. Within this data is included error due to the asymmetry of the pair poles.

According to one embodiment of the present invention, a plurality of zero cross signals is detected for each rotation of the rotor. From these zero cross signals, pair pole asymmetry is identified. Once identified, calculation for the rotor speed and the following commutation is adjusted based on the now known presence of pair pole asymmetry.

To better understand the advantages of the present invention, consider the following example. Consider a rotor having four pair poles. For this example consider only zero crossings having a positive slope for a single phase. One skilled in the art will recognize that a rotor can have a plurality of pair poles yielding an electrical period having both positive and negative slope zero crossings and each pair pole can be associated with a plurality of phases.

For the present example, there are four positive slope zero crossings for each mechanical turn of the rotor. Each separate crossing bounds an electrical period thus identifying four separate electrical periods, A, B, C, and D, for each mechanical turn of the rotor. Over the course of a plurality of revolutions of the rotor, data regarding a plurality of electrical period events for each electrical period, A, B, C, and D, can be gathered. Using this data, an average electrical period, A avg., B avg., C avg., and D avg., can be determined. Furthermore, an overall electrical period average ("EP avg.") can be found by adding these four averages and dividing by four.

Recall that each electrical period is bounded by two successive positive slope zero cross signals. These zero cross signals include error associated with the asymmetry of the pair pole. A corrected zero cross signal can be found by adding to the zero cross signal ("ZC1") the difference between the overall electrical period average ("EP avg.") and the electrical period average for that particular electrical period ("A avg.") or ZC1+EP avg.−A avg. As the rotor turns, the effect of the error is cumulative thus the correction for the next period must include the difference between the overall electrical period average and the average for periods A and B. In similar fashion, the remainder of the zero cross signals for each turn of the rotor can be modified so as to be compensated for pair pole asymmetry.

One skilled in the art will recognize that the technique described above identifies a systematic perturbation in the sinusoidal wave form generated by the passing of the north and south poles located in the rotor. These perturbations are caused, in part, by the asymmetry associated with each pair pole. The simplified example above demonstrates one possible technique by which to identify and remove the error associated with this asymmetry. Indeed multiple phases can be considered for each pair pole as can both positive and negative slope crossings. As will be recognized by one skilled in the art, these and other implementation methodologies for pair pole asymmetry compensation can be successfully accomplished without departing from the aforementioned methodology. These implementation methodologies are known within the art and the specifics of their application within the context of the present invention will be readily apparent to one of ordinary skill in the relevant art in light of this specification.

Figure 3:
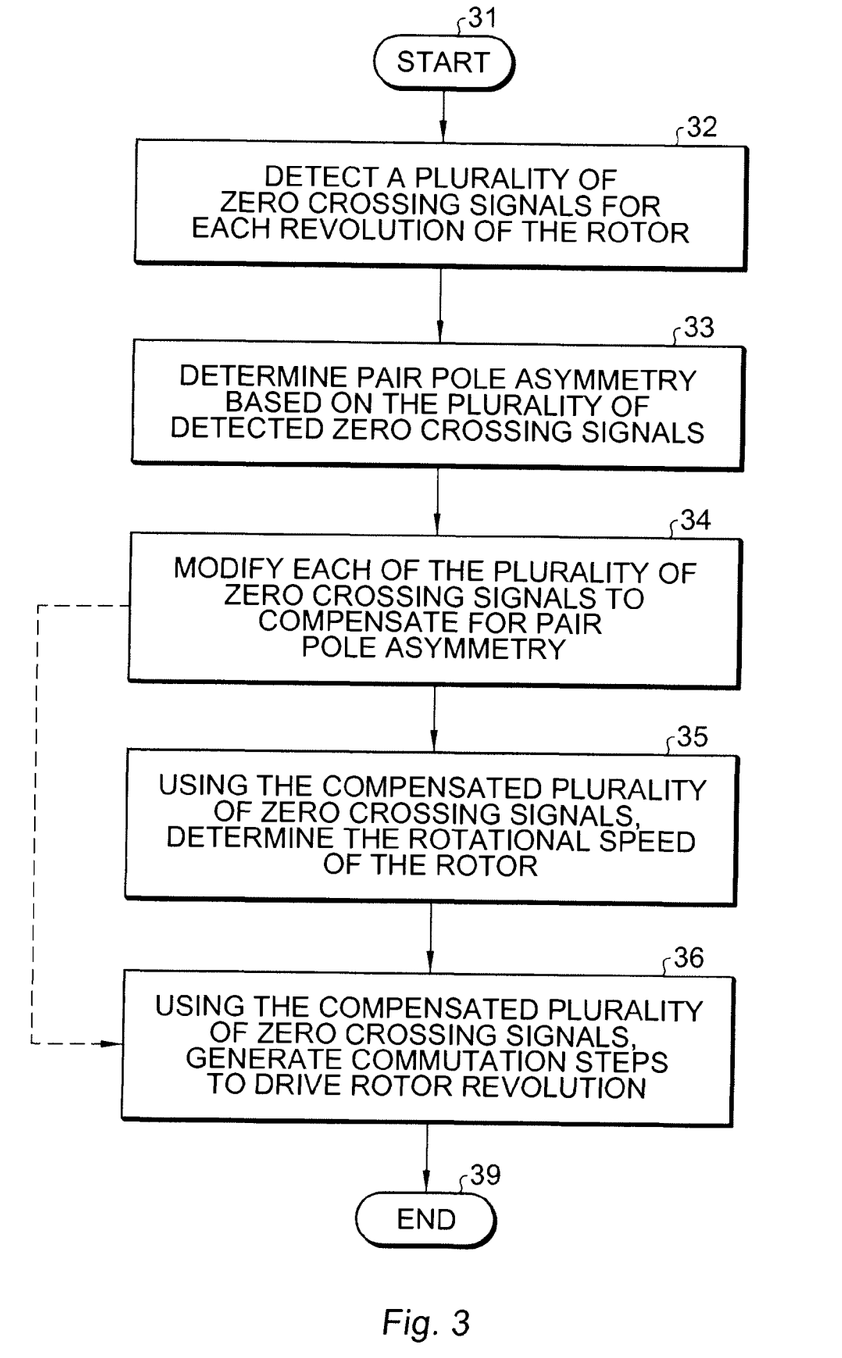
FIG. 3 is a flowchart of one method embodiment or reducing pair pole asymmetry from disk drive jitter according to the present invention.

FIG. 3 is a high level flowchart for one embodiment of a method for compensating zero cross signals for pair pole asymmetry according to the present invention. In the following description, it will be understood that each block of the flowchart illustration, and combinations of blocks in the flowchart illustration, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

The process begins 31 with the detection 32 of a plurality of zero crossing signals fore each revolution of the rotor. For each passing of a pair pole, and for each detected zero crossing, an electrical period is measured until the subsequent zero crossing associated with the same pair pole phase. Over a plurality of revolutions of the rotor, several data points with respect to each electrical period can be gathered. Each zero crossing signal, and indeed each electrical period associated with each zero crossing period, includes systematic error as the result of pair pole asymmetry. Using a variety of statistical techniques known in the art, systematic perturbations between the various electrical periods as a result of pair pole asymmetry can be determined 33 as opposed to the random variances associated with electrical noise and rotor speed.

Responsive to the systematic pair pole error begin identified, each zero crossing signal is modified 34 so as to compensate for the systematic pair pole asymmetry. Using the corrected zero crossing signals, the rotor speed can then be more accurately determined 35 and/or the signals generated by the commutation circuit can be more accurately processed 36 to drive the disk drive motor.

One skilled in the relevant art will recognize that other implementation techniques can be used consistent with this disclosure without departing from the spirit of the present invention. According to one embodiment of the present invention, data from a plurality of zero cross signals over a series of rotations can be extracted so as to result in the ability to correct/modify each zero cross that follows to more accurately portray the true speed and rotation of the rotor. Alternatively, and according to another embodiment of the present invention, data from a number of rotations can be cached, then used to correct/modify the zero crossings for a set number of rotations. While this particular modification value is used, a new set of data is cached so as to later refine the modification calculations. According to another embodiment of the present invention, the collection of zero crossing data and application of a modification value can be run continuously. Using an algorithm with low pass filtering the calculations to correct for pair pole asymmetry can be continuously modified. Latter data values are given more weight consistent with a set of predefined conditions.

By removing the pair pole asymmetric error from the determination of the rotor speed and/or the calculations of commutation signals, performance of the disk drive can be significantly enhanced. For example, upon recognition by control circuitry that the speed of the disk is outside of a particular tolerance, aggressive manipulations can take place using the commutation circuit/spindle speed central circuit with increased confidence that the readings are a true reflection of the actual speed variation of the disk. The disk drives of the past were designed to operate only in low vibration environments and with low data density. As data density increases and the operating environment is subjected to frequent vibrations, the tolerance for accurate spindle control is increasingly important. The present invention disclosed herein provides a more accurate determination of spindle position and speed and enables the spindle controller to be more aggressive in its response to spindle perturbations.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with disk spindle control, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A method for reducing jitter associated with a disk drive motor assembly wherein the disk drive motor assembly includes a rotor having a plurality of pair poles and a stator, the method comprising:

detecting, for a single rotation of the rotor, a plurality of zero cross signals;

determining rotation data for each of the detected plurality of zero cross signals;

collecting a set of rotation data over a plurality of rotations for each of the detected plurality of zero cross signals;

averaging separately each set of rotation data for each of the detected plurality of zero cross signals forming a plurality of set averages;

averaging the plurality of set averages creating an overall average;

ascertaining pair pole asymmetry for each zero cross signal by comparing the plurality of set averages to the overall average; and reducing jitter by removing pair pole asymmetry from each of the plurality of zero cross signals.

2. The method of claim 1 wherein each zero cross signal is generated from a back electromotive force signal associated with each of the plurality of pair poles.

3. The method of claim 2 wherein the plurality of zero cross signals includes at least one zero cross signal from each of the plurality of pair poles associated with the rotor.

4. The method of claim 1 further comprising controlling rotor speed using the plurality of zero cross signals from which pair pole asymmetry has been removed.

5. The method of claim 1 further comprising altering commutation calculations based on the plurality of zero cross signals from which pair pole asymmetry has been removed.

6. A method for controlling spindle speed in a disk drive assembly wherein the disk drive assembly includes a rotor having a plurality of pair poles and a stator, the method comprising:

detecting, for each rotation of the rotor, a plurality of zero cross signals;

determining pair pole asymmetry associated with each of the plurality of zero cross signals;

calculating rotor speed based on the plurality of zero cross signals wherein each of the plurality of zero cross signals is adjusted for pair pole asymmetry; and modifying commutation calculations based on pair pole asymmetry.

7. The method of claim 6 wherein each of the plurality of zero cross signals is generated from a back electromotive force signal.

8. The method of claim 6 wherein the plurality of zero cross signals includes at least one zero cross signal from each of the plurality of pair poles associated with the rotor.

9. The method of claim 6 wherein determining includes, for each rotation of the rotor, calculating a rotation period based on the plurality of zero cross signals.

10. The method of claim 9 wherein determining includes calculating a plurality of average rotation periods.

11. The method of claim 10 wherein each of the plurality of average rotation periods is based on a unique combination of the plurality of zero cross signals.

12. A method for controlling a disk drive motor assembly wherein the disk drive motor assembly includes a rotor having a plurality of pair poles and a stator, the method comprising:

detecting for each rotation of the rotor a plurality of zero cross signals;

removing pair pole asymmetry from each of the plurality of zero cross signals forming a plurality of corrected zero cross signals;

determining rotor speed based on at least two of the plurality of corrected zero cross signals; and generating a plurality of commutation steps based on at least two of the plurality of corrected zero cross signals.

13. The method of claim 12 wherein the plurality of zero cross signals includes at least one zero cross signal from each of the plurality of pair poles associated with the rotor.

14. The method of claim 12 wherein each of the plurality of zero cross signals is associated with one of the plurality of pair poles associated with the rotor.

15. The method of claim 12 wherein each of the plurality of pair poles is associated with two or more of the plurality of zero cross signals.

16. The method of claim 12 wherein each zero cross signal is generated from a back electromotive force signal associated with one of the plurality of pair poles.

17. The method of claim 12 wherein removing includes determining, for each rotation of the rotor, a plurality of electrical periods based on the plurality of zero cross signals.

18. The method of claim 17 wherein removing includes averaging separately the plurality of electrical periods responsive to a plurality of rotor revolutions forming a plurality of separate averages.

19. The method of claim 18 wherein removing includes averaging the plurality of separate averages to form an electrical period mean.

20. The method of claim 19 wherein removing includes modifying each of the plurality of zero cross signals based on a comparison of the plurality of separate averages and the electrical period mean.

21. A method for controlling a disk drive motor assembly wherein the disk drive motor assembly includes a rotor having a plurality of pair poles and a stator, the method comprising:

detecting for each rotation of the rotor a plurality of zero cross signals;

removing pair pole asymmetry from each of the plurality of zero cross signals forming a plurality of corrected zero cross signals;

determining rotor speed based on at least one of the plurality of corrected zero cross signals; and generating a plurality of commutation steps based on at least one of the plurality of corrected zero cross signals.

22. The method of claim 21 wherein the plurality of zero cross signals includes at least one zero cross signal from each of the plurality of pair poles associated with the rotor.

23. The method of claim 21 wherein each of the plurality of zero cross signals is associated with one of the plurality of pair poles associated with the rotor.

24. The method of claim 21 wherein each of the plurality of pair poles is associated with two or more of the plurality of zero cross signals.

25. The method of claim 21 wherein each zero cross signal is generated from a back electromotive force signal associated with one of the plurality of pair poles.

26. The method of claim 21 wherein removing includes determining for each rotation of the rotor a plurality of electrical periods based on the plurality of zero cross signals.

27. The method of claim 26 wherein removing includes averaging separately the plurality of electrical periods responsive to a plurality of rotor revolutions forming a plurality of separate averages.

28. The method of claim 27 wherein removing includes averaging the plurality of separate averages to form an electrical period mean.

29. The method of claim 28 wherein removing includes modifying each of the plurality of zero cross signals based on a comparison of the plurality of separate averages and the electrical period mean.

* * * * *